United States Patent [19]
White

[11] Patent Number: 5,386,494
[45] Date of Patent: Jan. 31, 1995

[54] METHOD AND APPARATUS FOR CONTROLLING A SPEECH RECOGNITION FUNCTION USING A CURSOR CONTROL DEVICE

[75] Inventor: George M. White, Portola Valley, Calif.

[73] Assignee: Apple Computer, Inc., Cupertino, Calif.

[21] Appl. No.: 80,451

[22] Filed: Jun. 21, 1993

Related U.S. Application Data

[63] Continuation of Ser. No. 804,077, Dec. 6, 1991, abandoned.

[51] Int. Cl.⁶ ............................................. G10L 5/06
[52] U.S. Cl. .................................... 395/2.84; 395/2.4; 381/41
[58] Field of Search ........................... 381/41–45; 395/2.4, 2.84, 2, 2.79, 2.44

[56] References Cited

U.S. PATENT DOCUMENTS

| | | | |
|---|---|---|---|
| 4,726,065 | 2/1988 | Froessl | 381/41 |
| 4,776,016 | 10/1988 | Hansen | 395/2 |
| 4,811,243 | 3/1989 | Racine | 381/43 |
| 4,829,576 | 5/1989 | Porter | 381/43 |
| 5,022,081 | 6/1991 | Hirose et al. | 381/43 |
| 5,133,011 | 7/1992 | McKiel | 381/48 |

*Primary Examiner*—Allen R. MacDonald
*Assistant Examiner*—Tariq Hafiz
*Attorney, Agent, or Firm*—Blakely, Sokoloff, Taylor & Zafman

[57] ABSTRACT

A computer system having speech recognition functionality, a display screen, a microphone, and a mouse having pointer and voice buttons. The voice button located on the mouse is used to turn the microphone "on" and "off". The voice button in conjunction with the mouse are used to signal the computer to display the recognized spoken command. The pointer button located on the mouse is used to provide a standard "point and click" function so that a user can select text or object(s) on the display screen. The computer will apply recognized spoken commands only to the restricted selection. Voice icons are used to aid in the correction of any erroneous interpretation by the speech recognizer circuitry within the computer. A list of alternative commands are displayed in menu format associated with each icon so that the user can use the voice button and mouse to select the desired correct command. The computer then automatically corrects the erroneous interpretation. Each alternative has its own separate menu of synonyms and paraphrases to aid in locating and identifying the correct command.

35 Claims, 4 Drawing Sheets

FIG_1
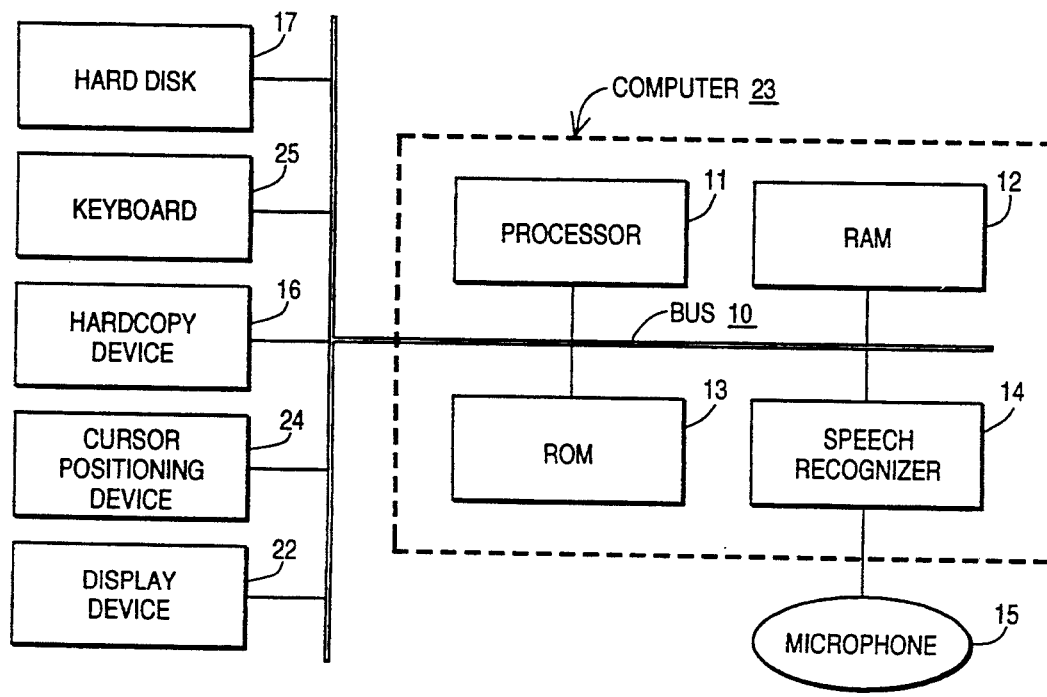
FIG_2
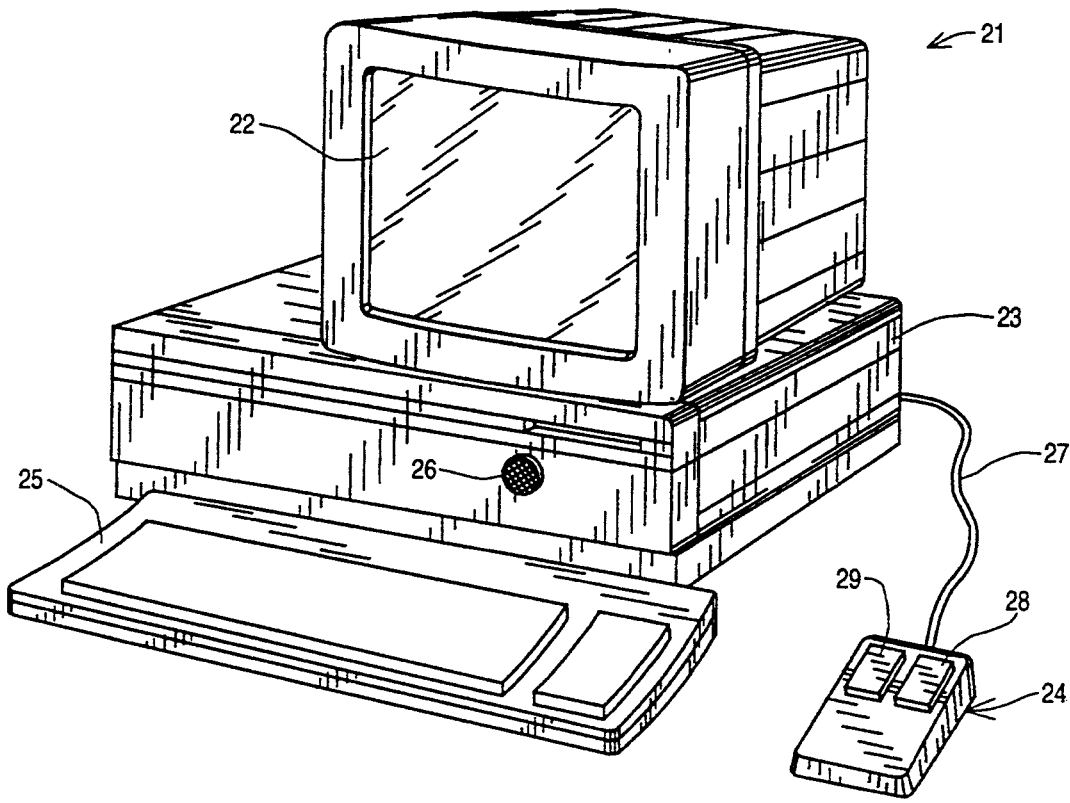

FIG_3
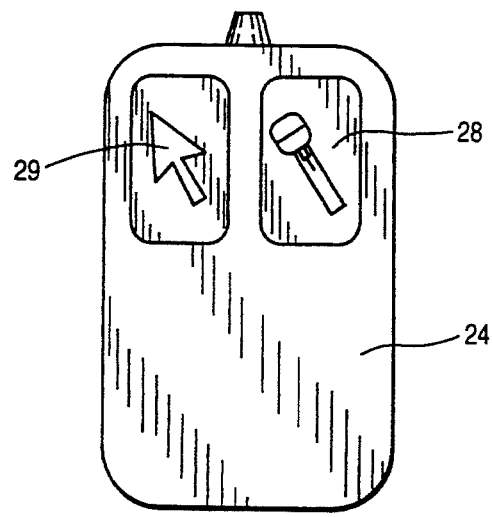
FIG_4
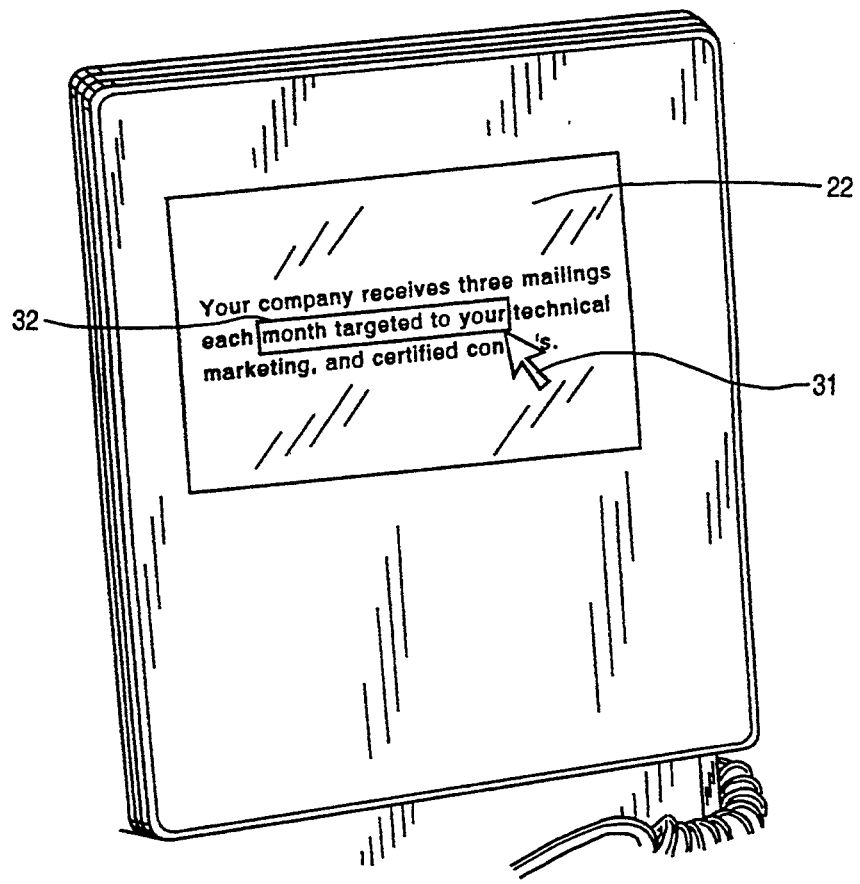

FIG_5A
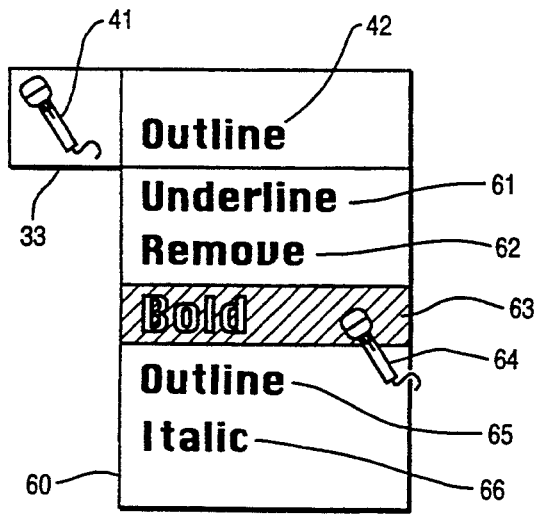
FIG_5B
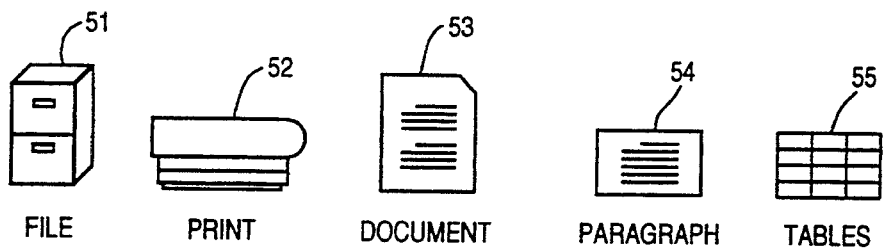
FIG_5C
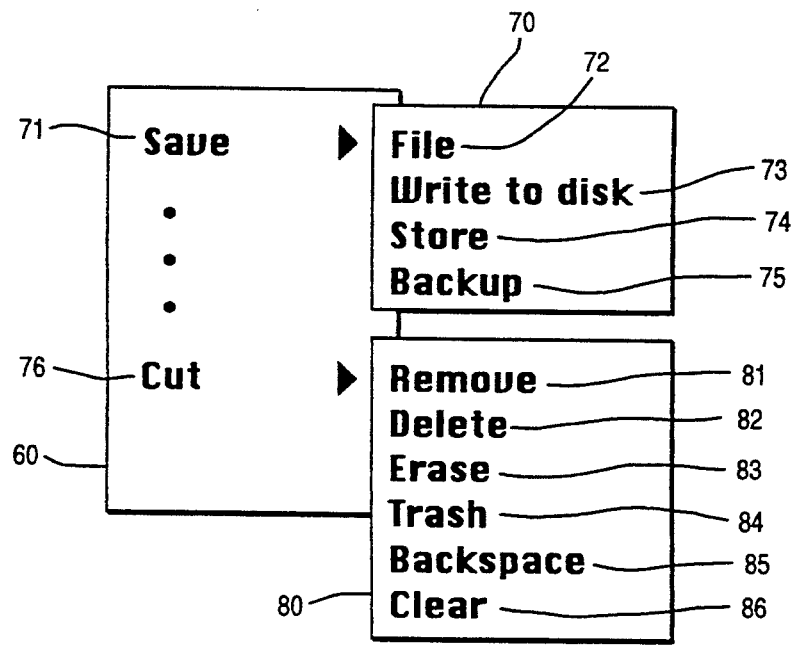

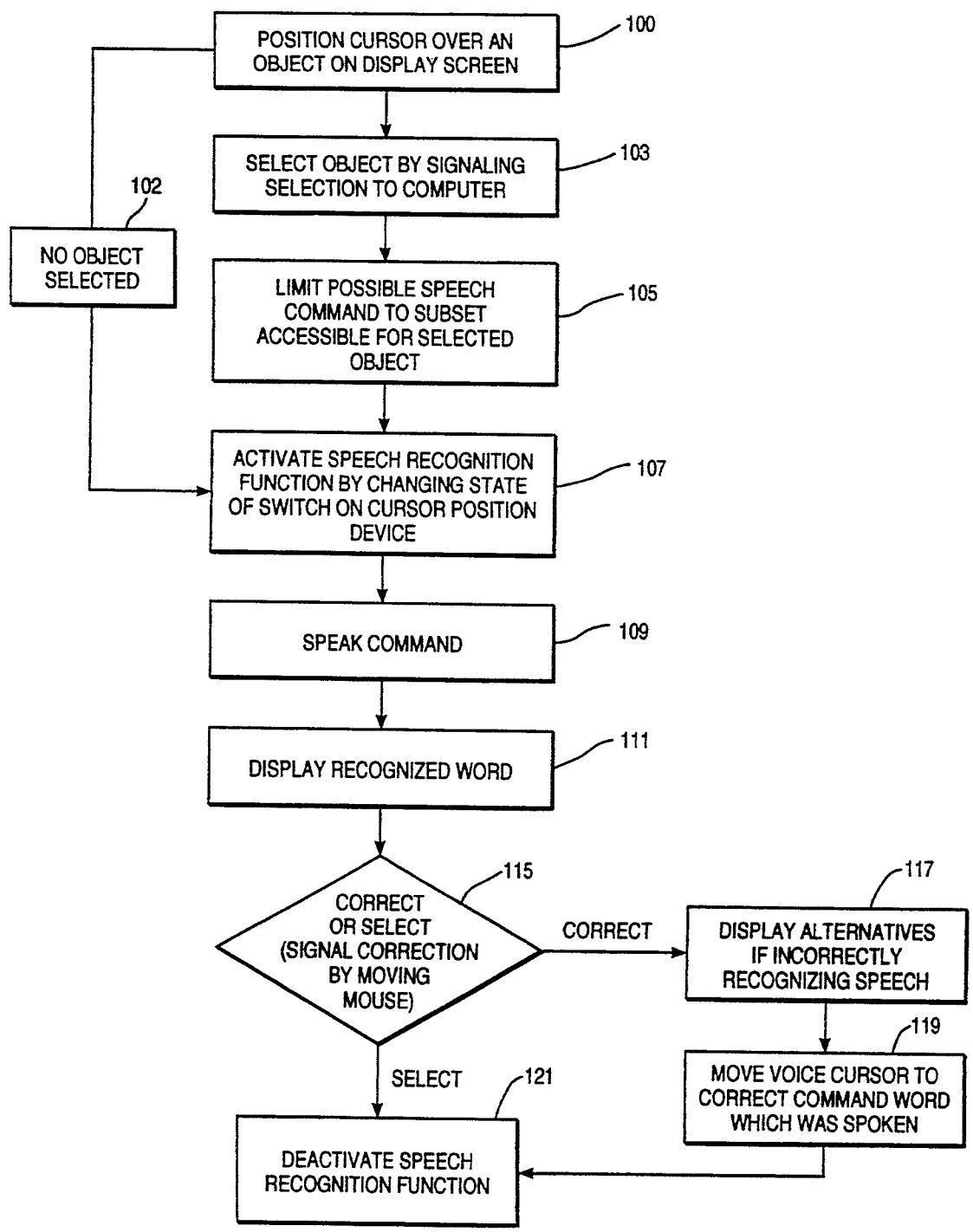

METHOD AND APPARATUS FOR CONTROLLING A SPEECH RECOGNITION FUNCTION USING A CURSOR CONTROL DEVICE

This is a continuation of application Serial No. 07/804.077, filed Dec. 6, 1991 now abandoned.

A portion of the disclosure of this patent document contains material, such as illustrations of graphical user interface images, which is protected by copyrights owned by the assignee of the present invention. The assignee hereby reserves it rights, including copyrights, in these materials, and each such material should be regarded as bearing the following notice: Copyright Apple Computer, Inc. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention pertains to the field of computer systems. More particularly, the present invention relates to a computer having speech recognition functionality, a display screen, a microphone, and a cursor control device.

BACKGROUND OF THE INVENTION

Typically, data is inputted into a computer by means of a QWERTY keyboard. This becomes cumbersome when inputting certain non-textual data or instructing the computer to execute certain commands. Time and effort is wasted, especially if the user has to frequently input such information. In order to make the human/machine interface more efficient and user-friendly, present computers often utilize special function keys, a mouse, pull-down menus, etc.

Special function keys execute a predetermined set of instructions to the computer by depressing a single key or key combinations. The mouse is a small hand-held box-like device which is typically coupled to the computer system by a cable and placed adjacent to the keyboard. Moving the mouse across a flat surface causes a moveable cursor on the computer's display screen to mimic the mouse's movements. Thus, the mouse is one of many cursor positioning devices which may be used to control a computer. One or more switches are provided on the mouse to signal the computer by depressing the switch that a desired location of the cursor on the display has been selected. The combination of moving the mouse to point the cursor to an object on the display screen and pressing the switch while the cursor is pointing to the object to select the object is called "point and click." Pull-down menus are used in conjunction with the mouse to help input commands to the computer. Pull-down menus and a mouse with a switch are described in U.S. Pat. No. Re. 32,632. A further description of pull-down menus may be found in U.S. Pat. No. 4,931,783.

In order to make the human/machine interface even more efficient and user-friendly, computers are being designed to recognize and respond to the user's spoken words. Optimally, this allows the user hands-free communication with the computer by allowing the user to speak into a microphone connected to the computer. A standard keyboard and/or mouse are also used in conjunction with the speech recognizer. This is due to limitations of the speech recognizer to correctly interpret context of human speech. A keyboard and a mouse is also used to allow an alternative method for interfacing with the computer (e.g., backup or if users feel more comfortable using the traditional method).

However, even though the speech recognition function enhances the input of data and commands to the computer, it has certain disadvantages over pure manual interfaces. One disadvantage is that the user can encounter difficulties in carrying on extraneous conversations because the machine would be listening and would be possibly falsely triggered into executing commands. Furthermore, loud background noises could also falsely trigger the speech recognizer.

This problem may be solved by employing a special button on the mouse, or a special function key or a switch on the keyboard or a footpedal switch. However, each of these except the mouse button pose disadvantages: a keyboard already has numerous keys and adding yet another key or switch makes operation that much more complicated; similarly, a footpedal switch makes operation more complicated, involves adding another port to the computer, running another cable and also increases cost by having to add on a special device.

Another problem associated with using a speech recognizer is that the user might desire the computer to effect changes on only certain objects on the display screen and not on the remainder.

Yet another problem with speech recognition interfaces is that the recognizer might erroneously interpret the spoken message or command.

SUMMARY AND OBJECTS OF THE INVENTION

In view of the problems associated with triggering the speech recognizer, one objective of the present invention is to provide a simple, natural, and cost effective method for turning a microphone on and off (e.g. a separate dedicated voice button) at the user's discretion by mounting it on the mouse or other cursor positioning device.

Another objective is to use the "point and click" feature to select text, pictures, and other objects on the display screen for restricting the vocabulary list of potential utterances to apply only to the selected objects, thereby achieving greater accuracy to the speech recognition process.

A further objective is to increase the speed of the speech recognizer by restricting potential utterances to apply only to the selected objects.

Another objective of this invention is to display the recognized voice command and allow the user an opportunity to correct an erroneous interpretation.

Yet another objective is to make locating, identifying, and cataloging alternative commands easier and faster.

Currently, computer systems are being designed with speech recognition functionality. These computers usually include traditional input devices such as keyboards and cursor positioning devices (e.g., a mouse). Hence, the object of this invention is to provide an interface between a user and a computer system having speech recognition system by improving and applying the traditional input devices to facilitate this interface. One embodiment of the present invention utilizes a dedicated switch or button mounted on the cursor positioning device for controlling the input and correction of spoken messages recognized by the computer.

In a typical embodiment, the speech recognition system accepts input from a microphone which is in a deactivated state. The microphone is activated when the computer receives a signal from the special mouse button. The microphone remains activated for the duration that the computer receives the signal from the button. Upon release of the button, the microphone is returned to its deactivated state. The computer only acts upon input received from the microphone when it is in the activated state. A push-down button is one embodiment. The push-down button is normally in the up position which correlates to the microphone being in a deactivated state. The microphone is activated when the push-down button is depressed and remains activated for the duration that the button is kept depressed. The button, when depressed, changes the state of a switch which controls the microphone or the speech recognizer. It would be obvious to one of ordinary skill in the art that other types of buttons and switches could also be employed in place of the "push-down" button.

Upon moving the cursor positioning device while the computer is receiving a signal from the switch or button, the spoken command recognized by the computer is displayed on the display screen. In addition, a list of alternative commands are displayed on the display screen near the recognized spoken command. The list and the recognized command are displayed so long as the computer receives a signal from the switch or button. This allows the user to check whether the computer correctly interpreted the spoken command.

If there is an erroneous interpretation, the user can correct it by utilizing a voice menu which contains a list of possible alternative commands. By positioning the moveable cursor next to the desired correct alternative command and terminating the signal from the switch or button, the computer undoes the erroneous command and executes the new correct command.

The cursor positioning device further comprises a second button. The combination of a cursor positioning device and the second button provides the point and click function which gives the user the ability to select objects on the display screen by pointing with the moveable cursor to an image on the display screen and pressing the button while the cursor is pointing to the image.

If more than one object is being selected, the user simply keeps the button depressed while moving the cursor over all desired objects. The spoken command recognized by the computer and/or a correction is executed only upon the selected objects. This gives the user the ability to selectively engage objects on the screen to which the voice commands or corrections apply.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a schematic diagram of a computer system.

FIG. 2 is a perspective view of a computer with a microphone, display screen, and a cursor positioning device with a pointer button and a voice button.

FIG. 3 is a top view showing the pointer button and voice button arrangement on the cursor positioning device.

FIG. 4 is a perspective view of a display screen with objects on the screen selected by a cursor such that voice commands apply only to the selected objects.

FIG. 5a is a diagram of voice icons used to select a voice pull-down or pop-up menu.

FIG. 5b is a diagram depicting a voice icons.

FIG. 5c is a diagram depicting a synonym menu.

FIG. 6 is a flowchart depicting a method according to the present invention.

DETAILED DESCRIPTION

A method and apparatus for controlling the input and correction of spoken commands or data is described.

A computer system which may be used with the present invention is described with reference to FIG. 1. The present invention may be implemented on a general purpose computer system, such as one of the members of the Apple Macintosh family, one of the members of the IBM Personal Computer family, or one of several work-station computers. A computer as may be utilized by the present invention generally comprises a bus or other communication means 10 for communicating information, a processing means 11 coupled with bus 10 for processing information, a random access memory (RAM) or other storage device 12 (commonly referred to as a main memory) coupled with bus 10 for storing information and instructions for said processor 11, a read only memory (ROM) or other static storage device 13 coupled with bus 10 for storing static information and instructions, a speech recognizer 14 coupled with bus 10 for converting spoken commands or data into a format understandable by processor 11, and a microphone 26 coupled with speech recognizer 14 for inputting spoken commands or data.

Additional devices comprising the computer system which are coupled to bus 10 include an alphanumeric input device (e.g., keyboard) 25 for communicating information and command selections to processor 11, a cursor positioning device 24, such as a mouse, trackball, joystick, touch tablet, cursor control keys, etc., for communicating information and command selections to processor 11 and for controlling cursor movement, a hardcopy device 16, such as a printer, providing permanent copies of information, a display screen 22, and a hard disk storage device 17.

Referring to FIG. 2, a perspective view of computer 23 with speech recognition circuitry contained therein (not shown) including display screen 22 (which may be a CRT display or a LCD display or other display means), keyboard 25, microphone 26 which is a means for inputting spoken commands into the computer 23, and cursor positioning device 24 is shown. The cursor positioning device 24 is connected to the computer 23 by means of a cable 27. Likewise, keyboard 25 and display screen 22 are similarly connected to computer 23 by cables (not shown). The microphone 26 may be embedded in the housing of computer 23 as shown in FIG. 2 or placed anywhere else. It may even be a stand alone unit which is plugged into computer 23 by a cable.

FIG. 3 is a top view of cursor positioning device 24. The device is a hand-held box-like device used to move a cursor (e.g. pointer 31 in FIG. 4 or voice cursor 64 in FIG. 5A) on the display screen 22. The device has two push-down buttons 28 and 29 mounted flush with the device housing when they are in the "up" position. Both buttons are mounted side by side on the top of device 24 such that when a user holds device 24 in one hand, the buttons may easily be depressed with either the index or middle fingers.

Button 28 is a voice button which may include an imprint of a microphone to distinguish it from the other button(s). One of its functions is to control the activation and deactivation of speech recognition by the computer 23 by activating or deactivating the microphone 26. Button 28 is normally in the up position. This corresponds to microphone 26 being in the deactivated state. Thus, microphone 26 is normally deactivated. When the user wishes to input a spoken command, message, or data to computer 23, the user must depress button 28 which causes a signal to be sent to computer 23 to activate microphone 26. Once microphone 26 is activated, it will input the received audio signals (e.g. spoken commands) to computer 23. Note that voice button 28 may also be used to trigger the voice recognizer system within computer 23 by supplying power to the recognizer or may control an amplifier for the microphone, which amplifier is normally deactivated until the voice button is depressed (to change the state of the switch means coupled to the button ). Microphone 26 will continue to be in the activated state for the duration that button 28 is kept depressed. Once button 28 is released, it will return to its normal "up" position, thereby deactivating microphone 26, which causes the computer to stop processing sounds/speech for the purpose of speech recognition.

Mounting voice button 28 on the cursor positioning device 24 is one preferred embodiment because it is convenient to place it at the user's fingertips, especially if the user is already holding the device. Also, it is natural to place the voice button on the same device used to position the voice cursor (discussed below). It will be appreciated that, in a typical embodiment, a switch having at least two states (on and off) will be mechanically coupled to the voice button 28.

Button 29 is a pointer button. It is used in conjunction with cursor positioning device 24 to provide the user with a "point and click" function so that the user can select text, graphics and other objects on display screen 22 as shown in FIG. 4. This is accomplished in one embodiment by positioning pointer cursor 31 to the left of the text desired to be selected 32. Next, button 29 is depressed which sends a signal to computer 23 indicating the starting position of text to be selected. While keeping button 29 depressed, the user moves cursor positioning device 24 in a horizontal left to right motion. In the currently preferred embodiment of the present invention, the selected text will be highlighted in white against a black strip background; alternatively, the text may be surrounded by a rectangle showing the selected text as shown in FIG. 4. The end of the desired text to be selected is indicated by releasing button 29. Note that any grouping of text may be selected depending upon the initial position of pointer cursor 31, the direction of moving cursor positioning device 24, and the duration that pointer button 29 is kept depressed. Pointer cursor 31 may be an arrow as shown in FIG. 4 or alternatively, a vertical bar shape, etc. In one preferred embodiment, pictures and objects on display screen 22 may, similarly, be selected by placing pointer cursor 31 on the picture or object while depressing and releasing button 29 without moving the pointer cursor away from the object or picture.

To de-select text, the user must depress and release pointer button 29 without moving cursor positioning device 29. To de-select pictures, the user must place pointer 31 on a blank area of display screen 22 and depress and release pointer button 29 without moving the cursor over any object. If the user selects a second object, the prior selected object(s) will automatically be deselected. This "point and click" function is well known in the art, and the many programs which operate on the Macintosh family of computers, from Apple Computer, Inc. of Cupertino, Calif., have examples of the "point and click" function.

Upon selection, computer 23 restricts the vocabulary list of potential utterances to apply only to the selected object(s). This provides the user with the flexibility to effect changes on certain limited object(s) without disturbing non-selected object(s). Furthermore, the context of the spoken command is limited to being applied only to the selected objects. The speech recognizer need only search through this limited context list. Thereby, the speed and accuracy of the speech recognizer is improved. The invention limits the possible speech commands which will be recognized based upon the object which is selected by having a preexisting list of speech commands for each object which can be selected.

As shown in FIG. 5A, the user can check to see that computer 23 correctly interpreted a spoken command. A microphone-shaped icon 41 and a recognized command 42 are displayed on the display screen 22 when the user speaks into the microphone while keeping the voice button depressed and moving the cursor positioning device. Again referring to FIG. 5a, the recognized command depicted is "Outline." Microphone-shaped icon 41 and recognized command 42 are displayed within a horizontally elongated rectangle which overlays any current object(s) being displayed on the display screen. Microphone icon 41 is left of command 42 with a vertical line separating the two. An alternate embodiment is to momentarily display microphone-shaped icon 41 and recognized command 42 on the display screen after the voice button is depressed and computer 23 has interpreted the spoken command. Alternatively the recognized command 42 and/or the microphone icon 41 are displayed as long as the speech recognition function is activated. In this case, while the recognized command 42 is displayed, it can be selected by deactivating speech recognition while the cursor is positioned over the recognized command 42 or not selected by deactivating speech recognition while the cursor is not positioned over the recognized command 42.

To correct an erroneous interpretation of a spoken command, this invention employs the use of voice icons and voice menus. FIG. 5b shows the preferred embodiment of different voice icons "File" 51, "Print" 52, "Document" 53, "Paragraph" 54, and "Tables" 55 which are displayed across, for example, the top of the display screen when the voice button is depressed. Voice icons are typically scaled-down representations of physical objects related to that particular category. On the preferred embodiment of the present invention, the voice icon for the "File" menu is the picture of a filing cabinet 51; "Print" is the picture of a printer 52; "Document" is the picture of the first page of a document 53; "Paragraph" is the picture of a rectangle with lines depicting sentences of a paragraph 54; and "Tables" is the picture of a grid 55. The voice icons are of course not restricted to only those shown in FIG. 5b.

Each voice icon has its own associated voice pulldown menu or pop-up menu. In turn, each voice pulldown menu contains a list of alternative commands which corresponds to the subject matter portrayed by the voice icons. In a preferred embodiment of the present invention, the voice pull-down menu is defined by a rectangular boundary within which is displayed a vertical list of the alternative commands or functions. The voice pull down menu is displayed when the voice icon associated with that pull down menu is selected. The alternatives may be arranged alphabetically or logically grouped to help the user find the desired alternative. The voice pull-down menu overlays any object(s) being displayed on the display screen. It is located, in a typical embodiment, directly underneath and touching the rectangle containing the microphone icon and the recognized command as discussed above in connection with FIG. 5A.

Referring back to FIG. 5A, a sample layout of a voice icon 41 and recognized command 42 bounded within a horizontal rectangle over a voice pull-down menu 60 is shown. Voice pull-down menu 60 contains a list of alternative commands: "Underline" 61, "Remove" 62, "Bold" 63, "Outline" 65, and "Italic" 66. Note that other commands or functions (e.g. plain, shadow, etc.) may also be included in this list.

The method by which the user corrects an erroneous interpretation by the speech recognizer is as follows. Returning to FIG. 2, the user initiates a command by depressing voice button 28 on the mouse which sends a signal to computer 23. The signal instructs computer 23 to replace the pointer cursor (shown as element 31 in FIG. 4) displayed on display screen 22 with a voice cursor (depicted by icon 64 in FIG. 5A). In other words, when voice button 28 is in the "up" position, the pointer cursor is displayed on display screen 22 and the voice cursor is not displayed. When voice button 28 is depressed, the pointer cursor is no longer displayed and a voice cursor is displayed in its stead. The voice cursor remains displayed for the duration that voice button 28 is depressed. This indicates to the user that the speech recognition system of the computer has been activated. Upon release of voice button 28, the voice cursor disappears from display screen 22 and is replaced by the pointer cursor. In the preferred embodiment of the present invention, the voice cursor is a moveable cursor in the image of a microphone (shown as element 64 in FIG. 5A). The user, while the speech recognition system has been activated, speaks a command which the speech recognition system processes and then displays the recognized command 42 (automatically or upon the user's request by moving the cursor positioning device while keeping the voice button depressed). The recognized command 42 is typically displayed along with a list of alternative possible commands. Alternatively, the recognized command may be displayed automatically without the list of alternatives, and the movement of the cursor positioning device while in speech recognition mode causes the alternative list to be displayed; in this example, the list of alternatives may constitute a pull down menu from the recognized command.

Referring to FIG. 5A (which shows a recognized command 42 being displayed along with a list of alternative commands), the user next positions the voice cursor 64 on or immediately adjacent the appropriate command by moving the cursor positioning device while keeping voice button 28 depressed. Thereupon, computer 23 will highlight the selected voice command in white on a black background. In the preferred embodiment of the present invention, computer 23 will display a horizontal rectangle containing voice cursor 64 and recognized command 42 so that the user can compare the erroneous recognized command with a list containing the correct desired command. In a typically embodiment, directly underneath and touching the recognized command 42 is the display of the voice menu containing a vertical list of alternative commands associated with the recognized command 42 or the selected voice icon.

The user selects the desired correct command by moving the cursor positioning device in a downward manner (i.e. towards the user). This causes voice cursor 64 to move down the vertical list of alternative commands. Note that the voice button is still being kept depressed. Each alternative will be highlighted in white on a black strip background when voice cursor 64 is moved on or immediately next to that alternative. When voice cursor 64 is moved on or immediately next to (in proximity with) the desired correct alternative, that alternative command is highlighted. The user executes the correct command by releasing the voice button. Upon release, the computer will return the selected object(s) (e.g. selected text 32) to the state which had existed prior to the execution of the erroneously recognized command (if it was executed). The computer will then execute the selected correct command.

An example is depicted in FIG. 5A. A voice icon 41 and an erroneous recognized command "Outline" 42 are displayed on top of a voice menu 60. Voice menu 60 contains a list of alternative commands such as "Underline" 61, "Remove" 62, "Bold" 63, "Outline" 65, and "Italic" 66. If the user wishes to "Bold'something (perhaps previously selected by the point and click method described above) but the computer erroneously interpreted the command to be "Outline", the user must position voice cursor 64 next to the desired correct command "Bold" 63. Thereby, "Bold" 63 is selected and highlighted. If the user now wishes to substitute the erroneously recognized command "Outline" 65 and replace it with the desired command "Bold" 63, the user simply releases the voice button. The computer executes the substitution by de-outlining the selected object(s) (if it was outlined) and embolding instead.

Another aspect of the currently preferred embodiment of the present invention is that the voice pull-down menu format can be used to display paraphrases or synonyms associated with a command, which paraphrases or synonyms may be alternative commands. This allows the user to quickly and easily access the synonym menu to check whether the computer has the capability to recognize the context of a spoken command. Furthermore, the main menu would remain uncluttered with redundant commands. The user can quickly scan the list of alternative commands to pick the correct command.

A sample format is shown in FIG. 5c. A command "Save" 71 is displayed in voice menu 60. As discussed above, by moving the voice cursor on or immediately adjacent to either side of "Save" 71, the user thereby selects and highlights the "Save" 71 command. In the preferred embodiment of the present invention, if the user moves the voice cursor in a left-to-right motion while still on the same horizontal plane of "Save" 71 (still keeping the voice button depressed), the computer will display a separate synonym menu 70 to the right of the selected command "Save" 71. Synonym menu 70 contains a vertical list of paraphrases and synonyms for "Save" 71 such as "File" 72, "Write to disk" 73, "Store" 74, and "Backup" 75. Note that other paraphrases and synonyms not shown herein may also be included in this menu.

This menu allows the user to learn the different words or phrases which can be spoken to effectuate the "Save" command. This arrangement also allows the voice menu to be uncluttered with different utterances effectuating the same command. The application thereby shortens the list, which makes selection easier and corrections faster. Still referring to FIG. 5c, voice menu 60 contains alternative command "Save" 71. It will not be cluttered with synonyms such as "File" 72, "Write to disk" 73, "Store" 74, or "Backup" 75.

Likewise, FIG. 5c also shows another synonym menu 80 for the command "Cut" 76. Synonym menu 80 contains synonyms for the command "Cut" 76. Some synonyms may include the following: "Remove" 81, "Delete" 82, "Erase" 83, "Trash" 84, "Backspace" 85, and "Clear" 86. Again, note that these synonyms are offered as examples and not limitations. Other synonyms may be included also. This menu will be displayed to the user if so selected (discussed above).

A preferred method of the present invention will now be described by referring to FIG. 6. The method uses the computer system shown in FIGS. 1 and 2, which includes the cursor positioning device 24 having a voice button 28 and a pointer button 29. The user of the computer system will typically position the cursor over an object on the display screen, as shown in step 100, using the cursor positioning device 24. Then the user may or may not select an object. If the user selects an object, in step 103 of FIG. 6, then the user will typically keep the cursor over the desired object and then depress and release the pointer button 29 to select the object. If the user does not select an object, in step 102, then the user will not use the pointer button 29 as described above. If the user selected an object in step 103, then the computer system in step 105 limits the possible speech commands which are available for execution by the computer to the list of preexisting speech commands for the selected object.

From steps 102 or 105, the method proceeds to step 107 in which the user activates the speech recognition function by depressing the voice button 28, which changes the state of a switch which is coupled to the button 28. It should be noted that if the user had not selected an object (step 102), then the cursor need not necessarily be over an object; in this case, the spoken command will often be what may be considered a general purpose command (e.g. "turn the computer off") for which no selection is necessary. In this circumstance, even if the cursor is over an object, as long as the object has not been selected then the spoken command can still be a general purpose command. It should also be noted that, in an alternative embodiment, it is possible for the object under the cursor to be selected merely by speaking a selection command when activating the speech recognition function.

After the speech recognition function has been activated (step 107), the user will speak a command (step 109) which may or may not (depending on the embodiment) be executed immediately. Next, the computer will display the recognized command (step 111), which will be typically displayed in the form shown in FIG. 5A without the alternative commands (thus, the recognized command 42 would be displayed without the alternative commands 61, 62, 63, 65 and 66, as shown in FIG. 5A). In an alternative embodiment, the recognized command would be displayed only upon the user's request, such as a movement of the cursor positioning device.

After displaying the recognized command, the user decides whether to correct the command or to select/confirm the command in step 115. If the user decides that the recognized command is correct, then the user selects the command by deactivating the speech recognition function in step 1 21 by releasing the voice button 28 (which has been depressed since step 107). If the command had been performed immediately after it was recognized, then the computer need not do anything further except remove the recognized command (and any alternative commands) from the display screen 22. If, on the other hand, the user decides that the recognized command is incorrect, then the user will signal to the computer that a correction is contemplated by the user and therefore the user desires to see alternative commands. Consequently, in step 115, the user will decide a correction is necessary and cause the alternative commands to be displayed by, for example, moving the mouse while keeping the voice button 28 depressed. The alternative commands are displayed, step 117, on the display screen and then the user may consider which alternative command is correct. The alternative commands may be displayed in many formats, including the pull down menu shown in FIG. 5A. The user then decides on the correct alternative command and positions the voice cursor 64 over or adjacent to the display of the correct alternative command (step 119) and then selects that command by deactivating the speech recognition function by releasing the voice button 28 (which has remained depressed since step 107).

In the foregoing specification the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is: METHOD AND APPARATUS FOR CONTROLLING A SPEECH RECOGNITION FUNCTION USING A CURSOR CONTROL DEVICE

1. A method for controlling a speech recognition function for a data processing system, the data processing system having a display, a speech recognition input device, and a cursor control device, the cursor control device having a first selector and a second selector separate from the first selector, the method comprising the steps of:

(a) displaying at least one object and a moveable cursor on the display;

(b) controlling the moveable cursor on the display in x and y directions simultaneously in response to user-manipulation of the cursor control device;

(c) selecting one of the at least one object displayed on the display in response to user-manipulation of the cursor control device and user-manipulation of the first selector of the cursor control device;

(d) activating the speech recognition function in response to engagement of the second selector of the cursor control device;

(e) inputting a spoken command for the data processing system by the speech recognition input device; and (f) deactivating the speech recognition function in response to disengagement of the second selector of the cursor control device.

2. The method of claim 1, wherein the controlling step (b) includes the step of controlling the moveable cursor on the display in response to user-manipulation of the cursor control device that comprises one of a mouse, a joystick, a track-ball, or a touch tablet.

3. The method of claim 1, wherein the inputting step (e) includes the step of inputting the spoken command by the speech recognition input device that includes a microphone.

4. The method of claim 1, wherein the first selector includes a pointer button and the selecting step (c) includes the steps of:
   (c)(i) selecting the one object in response to user-manipulation of the cursor control device in positioning the moveable cursor on the display and user-manipulation of the pointer button, and
   (c)(ii) indicating on the display the selection of the one object.

5. The method of claim 1, wherein the second selector includes a voice button and the activating step (d) includes the step of activating the speech recognition function in response to depression of the voice button.

6. The method of claim 1, further comprising the step of:
   (g) applying the spoken command inputted for the data processing system to only the selected one object.

7. The method of claim 6, wherein the selected one object has an associated list of speech commands and the applying step (g) includes the step of applying the spoken command to the selected one object if the spoken command is included in the associated list of speech commands.

8. The method of claim 1, further comprising the step of:
   (g) changing the display of the moveable cursor on the display to indicate the speech recognition function is activated.

9. The method of claim 1, further comprising the step of:
   (g) displaying on the display the spoken command inputted for the data processing system.

10. The method of claim 9, wherein the displaying step (g) includes the step of displaying on the display the spoken command in response to user-manipulation of the cursor control device.

11. The method of claim 9, further comprising the steps of:
   (h) displaying on the display a list of alternative commands for the spoken command; and
   (i) selecting either the spoken command or one of the commands in the list of alternative commands in response to user-manipulation of the cursor control device.

12. The method of claim 11, wherein the displaying step (h) includes the step of displaying the list of alternative commands as a menu and the selecting step (i) includes the step of selecting and displaying a synonym menu for one of the alternative commands.

13. A method for controlling a speech recognition function for a data processing system, the data processing system having a display, a speech recognition input device, and a cursor control device, the cursor control device having a selector, the method comprising the steps of:
   (a) displaying at least one object and a moveable cursor on the display;
   (b) controlling the moveable cursor on the display in x and y directions simultaneously in response to user-manipulation of the cursor control device;
   (c) selecting one of the at least one object displayed on the display;
   (d) activating the speech recognition function in response to engagement of the selector of the cursor control device;
   (e) inputting a spoken command for the data processing system by the speech recognition input device;
   (f) applying the spoken command inputted for the data processing system to only the selected one object; and
   (g) deactivating the speech recognition function in response to disengagement of the selector of the cursor control device.

14. The method of claim 13, wherein the controlling step (b) includes the step of controlling the moveable cursor on the display in response to user-manipulation of the cursor control device that comprises one of a mouse, a joystick, a track-ball, or a touch tablet.

15. The method of claim 13, wherein the inputting step (e) includes the step of inputting the spoken command by the speech recognition input device includes a microphone.

16. The method of claim 13, wherein the selector includes a voice button and the activating step (d) includes the step of activating the speech recognition function in response to depression of the voice button.

17. The method of claim 13, wherein the selected one object has an associated list of speech commands and the applying step (f) includes the step of applying the spoken command to the selected object if the spoken command is included in the associated list of speech commands.

18. A method for controlling a speech recognition function for a data processing system, the data processing system having a display, a speech recognition input device, and a cursor control device, the cursor control device having a selector, the method comprising the steps of:
   (a) displaying at least one object and a moveable cursor on the display;
   (b) controlling the moveable cursor on the display in x and y directions simultaneously in response to user-manipulation of the cursor control device;
   (c) selecting one of the at least one object displayed on the display;
   (d) activating the speech recognition function in response to engagement of the selector of the cursor control device;
   (e) inputting a spoken command for the data processing system by the speech recognition input device;
   (f) displaying on the display the spoken command inputted for the data processing system;
   (g) displaying on the display a list of alternative commands for the spoken command;
   (h) selecting either the spoken command or one of the commands in the list of alternative commands in response to user-manipulation of the cursor control device; and
   (i) deactivating the speech recognition function in response to disengagement of the selector of the cursor control device.

19. The method of claim 18, wherein the controlling step (b) includes the step of controlling the moveable cursor on the display in response to user-manipulation of the cursor control device that comprises one of a mouse, a joystick, a track-ball, or a touch tablet.

20. The method of claim 18, wherein the inputting step (e) includes the step of inputting the spoken command by the speech recognition input device that includes a microphone.

21. The method of claim 18, wherein the selector includes a voice button and the activating step (d) includes the step of activating the speech recognition function in response to depression of the voice button.

22. The method of claim 18, further comprising the step of:
   (j) changing the display of the moveable cursor on the display to indicate the speech recognition function is activated.

23. The method of claim 18, wherein the displaying step (g) includes the step of displaying the list of alternative commands as a menu and the selecting step (h) includes the step of selecting and displaying a synonym menu for one of the alternative commands.

24. An apparatus for controlling a speech recognition function comprising:
   (a) a data processing system having a speech recognition function and having a display, the data processing system for displaying at least one object and a moveable cursor on the display;
   (b) a speech recognition input device coupled to the data processing system for inputting spoken commands for the data processing system; and
   (c) a cursor control device coupled to the data processing system for controlling the moveable cursor displayed on the display in x and y directions simultaneously, the cursor control device including:
      (i) a first selector for selecting one of the at least one object displayed on the display, and
      (ii) a second selector separate from the first selector for activating and deactivating the speech recognition function of the data processing system.

25. The apparatus of claim 24, wherein the cursor control device comprises one of a mouse, a joystick, a track-ball, or a touch tablet.

26. The apparatus of claim 24, wherein the speech recognition input device includes a microphone.

27. The apparatus of claim 24, wherein the first selector includes a pointer button, the cursor control device is for selecting the one object in response to user-manipulation of the pointer button, and the data processing system is for indicating on the display the selection of the one object.

28. The apparatus of claim 24, Wherein the second selector includes a voice button and the data processing system activates the speech recognition function in response to depression of the voice button.

29. The apparatus of claim 24, wherein the data processing system applies the spoken command inputted for the data processing system to only the selected one object.

30. The apparatus of claim 29, wherein the selected one object has an associated list of speech commands and the data processing system applies the spoken command to the selected one object if the spoken command is included in the associated list of speech commands.

31. The apparatus of claim 24, wherein the data processing system changes the display of the moveable cursor on the display to indicate the speech recognition function is activated.

32. The apparatus of claim 24, wherein the data processing system displays on the display the spoken command inputted for the data processing system.

33. The apparatus of claim 32, wherein the data processing system displays on the display the spoken command in response to user-manipulation of the cursor control device.

34. The apparatus of claim 32, wherein the data processing system is for displaying on the display a list of alternative commands for the spoken command and the cursor control device is for selecting either the spoken command or one of the commands in the list of alternative commands.

35. The apparatus of claim 34, wherein the data processing system is for displaying the list of alternative commands as a menu and for displaying a synonym menu for one of the alternative commands in response to user-manipulation of the cursor control device.

* * * * *